US011284422B2

(12) United States Patent
Worrall

(10) Patent No.: US 11,284,422 B2
(45) Date of Patent: Mar. 22, 2022

(54) DUAL CONNECTIVITY NETWORK

(71) Applicant: Alcatel Lucent, Boulogne Billancourt (FR)

(72) Inventor: Chandrika K. Worrall, Bristol (GB)

(73) Assignee: Nokia Technologies Oy, Espoo (FI)

(*) Notice: Subject to any disclaimer, the term of this patent is extended or adjusted under 35 U.S.C. 154(b) by 452 days.

(21) Appl. No.: 14/782,353

(22) PCT Filed: Mar. 12, 2014

(86) PCT No.: PCT/EP2014/000661
§ 371 (c)(1),
(2) Date: Oct. 5, 2015

(87) PCT Pub. No.: WO2014/161629
PCT Pub. Date: Oct. 9, 2014

(65) Prior Publication Data
US 2016/0073427 A1 Mar. 10, 2016

(30) Foreign Application Priority Data
Apr. 5, 2013 (EP) .................................... 13305447

(51) Int. Cl.
*H04L 5/14* (2006.01)
*H04W 36/22* (2009.01)
(Continued)

(52) U.S. Cl.
CPC ... *H04W 72/1284* (2013.01); *H04W 28/0278* (2013.01)

(58) Field of Classification Search
CPC ......... H04W 28/0278; H04W 72/1284; H04W 1/0026; H04W 72/12; H04W 36/00835; H04B 17/309
(Continued)

(56) References Cited

U.S. PATENT DOCUMENTS

2011/0268045 A1* 11/2011 Heo ..................... H04L 1/0027
370/329
2012/0044814 A1* 2/2012 Natarajan .............. H04B 7/155
370/246
(Continued)

FOREIGN PATENT DOCUMENTS

CN 101179495 A 5/2008
CN 102368873 A 3/2012
(Continued)

OTHER PUBLICATIONS

NTT DOCOMO, "Physical Layer Design for Dual Connectivity", Jan. 2013, 3GPP TSG RAN WG1 Meeting #72, R1-130409.
(Continued)

Primary Examiner — Asad M Nawaz
Assistant Examiner — Jason A Harley
(74) Attorney, Agent, or Firm — Fay Sharpe LLP

(57) ABSTRACT

A method of transmitting an indication of user equipment uplink buffer status in a wireless communications network in which user equipment is configured to communicate with one or more base stations using dual connectivity techniques, a computer program product and user equipment operable to perform that method. The method comprises: receiving an indication of a dual connectivity configuration to be used by the user equipment for uplink transmission; structuring an uplink buffer status report to group uplink buffer status by one or more scheduler to be used by the user equipment according to the received indication of a dual connectivity configuration; and transmitting the structured uplink buffer status report to the one or more base stations. Aspects and embodiments provide a method for providing buffer status reports in a network offering dual connectivity functionality according to which user equipment is served by multiple independent schedulers which may be connected via a non-ideal backhaul link.

13 Claims, 4 Drawing Sheets

(51) Int. Cl.
  *H04L 5/00* (2006.01)
  *H04L 12/26* (2006.01)
  *H04W 76/10* (2018.01)
  *H04W 24/10* (2009.01)
  *H04W 72/12* (2009.01)
  *H04W 28/02* (2009.01)

(58) Field of Classification Search
  USPC .......................................... 370/331; 455/444
  See application file for complete search history.

(56) References Cited

U.S. PATENT DOCUMENTS

| | | | | |
|---|---|---|---|---|
| 2012/0164979 | A1* | 6/2012 | Bachmann | H04W 12/062 455/411 |
| 2012/0307757 | A1* | 12/2012 | Edler Von Elbwart | H04W 72/087 370/329 |
| 2013/0176953 | A1* | 7/2013 | Stern-Berkowitz | H04W 52/146 370/329 |
| 2014/0029584 | A1* | 1/2014 | Qu | H04W 72/042 370/336 |
| 2014/0044109 | A1* | 2/2014 | Nogami | H04L 1/003 370/336 |
| 2014/0192740 | A1* | 7/2014 | Ekpenyong | H04L 5/0035 370/329 |
| 2014/0293896 | A1* | 10/2014 | Kuo | H04W 72/0413 370/329 |
| 2016/0073427 | A1* | 3/2016 | Worrall | H04W 28/0278 370/329 |

FOREIGN PATENT DOCUMENTS

| | | |
|---|---|---|
| EP | 2 568 759 A1 | 3/2013 |
| WO | 2011/100492 A | 8/2011 |
| WO | 2011/100673 A | 8/2011 |

OTHER PUBLICATIONS

Nokia, "Buffer reporting for E-UTRAN," $3^{rd}$ Generation Partnership Project (3GPP), 3GPP TSG-RAN WG2 Meeting #52, R2-060829, pp. 1-5, XP002503218, Athens, Greece, Mar. 27-31, 2006.

John L. Tomici et al., "Multi-RAT Traffic Offloading Solutions for the Bandwidth Crunch Problem," Systems, Applications and Technology Conference, IEEE, pp. 1-6, XP031880722, 2011.

Motorola, "Comparison of UL buffer reporting/scheduling schemes in LTE," $3^{rd}$ Generation Partnership Project (3GPP), 3GPP TSG-RAN WG2 LTE Ad Hoc Meeting, R2-061915, pp. 1-4, XP002503219, Cannes, France, Jun. 27-30, 2006.

International Search Report for PCT/EP2014/000661 dated Apr. 23, 2014.

NTT DOCOMO, Inc., "New Study Item Description: Small Cell enhancements for E-UTRA and E-UTRAN—Higher-layer aspects," $3^{rd}$ Generation Partnership Project (3GPP), 3GPP TSG-RAN Meeting#58, RP-122033, 5 pages, Barcelona, Spain, Dec. 4-12, 2012.

* cited by examiner

Short BSR and Truncated BSR MAC control element

Long BSR MAC control element

SR trigger and transmission of SR on D-SR when multiple D-SR are configured for the UE.
(a) Both SR1 and SR2 triggered at the same time and SR1 is transmitted on D-SR1 and SR2 is transmitted on D-SR2
(b) both SR1 and SR2 are triggered, only SR1 is transmitted on D-SR1
(c). only SR2 is triggered, SR2 is transmitted on D-SR2

SR trigger and transmission of SR on D-SR when single D-SR is configured for the UE.
(a) both SR1 and SR2 triggered at the same time and SR1 is transmitted on D-SR
(b) both SR2 is triggered, SR2 is transmitted on D-SR

DUAL CONNECTIVITY NETWORK

FIELD OF THE INVENTION

The present invention relates to a method of transmitting an indication of user equipment uplink buffer status in a wireless communications network in which user equipment is configured to communicate with one or more base stations using dual connectivity techniques; a computer program product and user equipment operable to perform that method.

BACKGROUND

Wireless telecommunication systems are known. In such systems, mobile communication devices (for example, mobile telephones) are operable to communicate with base stations provided by network providers.

In known wireless telecommunication systems, radio coverage is provided to network connectable devices, such as mobile telephones, or wireless devices such as iPads or other similar tablets, within areas known as cells. A base station is located in each cell to provide radio coverage. Typically, network connectable devices in each cell are operable to receive information and data from a base station and to transmit information and data to a base station.

User equipment roam through a wireless communications system. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

Traditional base stations provide coverage in relatively large geographical areas and those cells are often referred to as macro cells. It is possible to provide a heterogeneous network (hetnet) where smaller sized cells are provided within macro cells. Such smaller sized cells are sometimes referred to as micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator. In some cases, "dual connectivity" may be offered such that a user and a network are configured to allow communication with a macro cell base station and a small cell base station. A number of dual connectivity implementations can be configured, each may offer different benefits.

Although dual connectivity HetNet deployments may offer advantages, unexpected consequences of such deployments may occur. It is desired to address those consequences.

SUMMARY

A first aspect provides a method of transmitting an indication of user equipment uplink buffer status in a wireless communications network in which user equipment is configured to communicate with one or more base stations using dual connectivity techniques, the method comprising: receiving an indication of a dual connectivity configuration to be used by the user equipment for uplink transmission; structuring an uplink buffer status report to group uplink buffer status by one or more scheduler to be used by the user equipment according to the received indication of a dual connectivity configuration; and transmitting the structured uplink buffer status report to the one or more base stations.

The first aspect recognizes that dual connectivity offers a way to offload data traffic in a network to a small cell as required. In a dual connectivity scenario user equipment is connected to more than one cell at a given time and the user equipment is served by more than one cell.

The first aspect recognizes that a scheduling request mechanism is likely to be required to support all dual connectivity scenarios. Typical network configuration assumes that user equipment is served by single scheduling base station or network control node and therefore a single scheduling request mechanism is used.

In a typical network deployment, backhaul communication between small cell base stations and between small cell base stations and macrocell base stations is non-ideal. That is to say, rather than offering immediate communication, there may be one way latency in the order of a few milliseconds to a few tens of milliseconds. In order for the small cell and macro base station to operate in a network to provide dual connectivity functionality with such backhaul latency, an independent scheduler is provided at each serving node. The provision of multiple independent schedulers, results in a need for an adapted scheduling request mechanism to allow efficient operation in a network in which multiple independent schedulers are provided to support dual connectivity to user equipment.

Traffic offloading may occur in relation to both downlink and uplink traffic in a network. Uplink dual connectivity operation with independent schedulers, requires that both independent schedulers are aware of a buffer status report of each user equipment. In a case where dual connectivity is implemented in the uplink, some data flows can be offloaded to the small cell base station. The offloaded traffic is scheduled by the corresponding small cell scheduler. The scheduler located at the small cell needs to be informed of the buffer status report corresponding to the offloaded traffic to be routed to the small cell.

Aspects and embodiments relate to a method of providing a suitable buffer status report to each serving schedulers supporting a dual connectivity configuration of a network. Furthermore, aspects and embodiments described herein provide a method to extract or construct a buffer status report to enable traffic offloading by a scheduler. The method may also be such that a buffer status report provides a scheduler with suitable data flow information directly from user equipment or from another cell.

Offloading uplink traffic in a dual connectivity capable network can be implemented, for example, using one of the following configurations:

In one configuration, user equipment may be operable to transmit all uplink traffic to one cell, for example, the small cell. In a co-channel deployment with dual connectivity, the user equipment may have strong downlink signal from a macro cell, whilst having low path loss in relation to uplink transmissions directed towards the small cell. In such a scenario, all uplink traffic can be transmitted from user equipment to the small cell. As a result, an uplink scheduling grant will originate from the small cell and the small cell requires a buffer status report relating to all the uplink traffic bearers.

In another configuration in a co-channel deployment with dual connectivity, some uplink data flows (radio bearers) can be offloaded to a small cell. According to such a configuration, the small cell is in charge of scheduling the offloaded traffic bearers and therefore the buffer status report relating to the offloaded traffic bearers needs to be known by the small cell.

In another configuration in a co-channel deployment with dual connectivity, uplink data can belong to a radio bearer which is scheduled and received by both macro and small cell, for example, in a network capable to implement multi flow or multi streaming techniques. In such a configuration, the buffer status report of the relevant radio bearer needs to be known by both the macro and small cell.

Aspects and embodiments provide a buffer status reporting mechanism designed to handle all the described configurations whilst maintaining a common buffer status report reporting mechanism.

In one embodiment, structuring the uplink buffer status report comprises constructing an independent uplink buffer status report for each scheduler to be used by the user equipment. Accordingly, user equipment is operable to format a buffer status report intended for schedulers at the macro and the small cell independently. According to such an embodiment, the resulting transmission considers and creates a different buffer status report MAC control element (buffer status report MAC CE) in relation to each serving scheduler. An indication of the identity of the intended scheduler (cell) is also included in the buffer status report MAC CE as a cell ID index. In an alternative embodiment, an indication of a cell ID is implicitly indicated via the LCID included in the MAC PDU sub-header. Such embodiments require transmission of a buffer status report MAC CE per serving cell. In a further embodiment, user equipment may be operable to map a buffer status report MAC PDU corresponding to granted uplink resources on a cell by cell basis and the uplink resource(s) used to transmit the buffer status report MAC is used as an implicit indication of which cell the buffer status report is intended for.

In one embodiment, structuring the uplink buffer status report comprises constructing a single uplink buffer status report including grouped buffer status information for each scheduler to be used by the user equipment. Accordingly, a single buffer status report MAC CE is designed to be used in relation to all serving cells. According to such an embodiment, an indication of serving cell identity is explicitly or implicitly included in a MAC CE. In case of an implicit indication, a buffer status report is formatted according to a cell order. Upon reception of the buffer status report MAC CE, a scheduler is operable to decode the buffer status report field corresponding to the cell it supports. According to some embodiments, the buffer status report MAC CE may be transmitted on any uplink resource granted by any cell.

According to such an embodiment, a user equipment specific scrambling code used as user equipment "identification" is known by both macro and small cells participating in a dual connectivity arrangement.

In a further embodiment, user equipment is operable to transmit buffer status report information towards a macro cell. In such an embodiment, LC Groups are configured in such a way to ensure that offloaded radio bearers belong to different LCGs to the bearers served by the macro cell. Upon reception of a buffer status report MAC CE, the macro cell is operable to extract the buffer status report corresponding to offloaded traffic and forward that information to the relevant small cell using the X2 interface. In such an embodiment, the buffer status report experiences backhaul latency. However, if only delay tolerant traffic is offloaded to the small cell, such a backhaul delay on the buffer status report may be tolerated by the small cell scheduler. In such an embodiment, the buffer status report information can be transmitted only on resource granted to a user by the macro cell.

In one embodiment, the grouped buffer status information includes an indication of a scheduler to which the information contained therein is of relevance. the user equipment may be configured to transmit buffer status report information to any cell (using resources granted by any cell). Upon reception of the buffer status report information, the cell extracts the buffer status report information corresponding to the traffic (radio bearers) being served by the cell and remaining buffer status report information is forwarded to the other cell over the X2 interface.

In one embodiment, the grouped buffer status information is encoded such that it can only be decoded by a scheduler to which the information is of relevance. In some embodiments, radio bearers which are served by the macro cell may not be revealed to the other cell, particularly in the case of inter vendor operation, and in such cases, the buffer status report information for each cell can be protected with cell specific coding.

In one embodiment, transmitting the structured uplink buffer status report comprises transmitting one of the independent uplink buffer status reports to each scheduler.

In one embodiment, transmitting the structured uplink buffer status report comprises using resource granted by the one or more base stations. Accordingly, use of granted resource may be utilised by user equipment to implicitly convey information to a scheduler. For example, in one embodiment the method further comprises choosing granted resource for transmission of the structured uplink buffer status report in dependence upon a scheduler to which the information is of relevance.

A second aspect provides a computer program product operable, when executed on a computer, to perform the method of the first aspect.

A third aspect provides user equipment operable to transmit an indication of user equipment uplink buffer status in a wireless communications network in which the user equipment is configured to communicate with one or more base stations using dual connectivity techniques, the user equipment comprising: reception logic operable to receive an indication of a dual connectivity configuration to be used by the user equipment for uplink transmission; buffer status logic operable to structure an uplink buffer status report to group uplink buffer status by one or more scheduler to be used by the user equipment according to the received indication of a dual connectivity configuration; and communication logic operable to transmit the structured uplink buffer status report to the one or more base stations.

In one embodiment, the buffer status logic is operable to structure the uplink buffer status report by constructing an independent uplink buffer status report for each scheduler to be used by the user equipment.

In one embodiment, the buffer status logic is operable to structure the uplink buffer status report by constructing a single uplink buffer status report including grouped buffer status information for each scheduler to be used by the user equipment.

In one embodiment, the grouped buffer status information includes an indication of a scheduler to which the information contained therein is of relevance.

In one embodiment, the grouped buffer status information is encoded such that it can only be decoded by a scheduler to which the information is of relevance.

In one embodiment, the transmission logic is operable to transmit one of the independent uplink buffer status reports to each scheduler.

In one embodiment, the transmission logic is operable to transmit the structured uplink buffer status report using resource granted by the one or more base stations.

In one embodiment, the transmission logic is operable to choose granted resource for transmission of the structured uplink buffer status report in dependence upon a scheduler to which the information is of relevance.

A fourth aspect provides a method of receiving an indication of user equipment uplink buffer status at a base station in a wireless communications network in which user equipment is configured to communicate with one or more base stations using dual connectivity techniques, the method comprising: determining a dual connectivity configuration being used by user equipment for uplink transmission; receiving a structured uplink buffer status report; and extracting information from the structured uplink buffer status report relevant to a scheduler at the base station. Accordingly a base station and/or associated scheduler in a network may be operable to receive and understand a newly structured buffer status report. That buffer status report may have a familiar format, or may require some adjustment to allow decoding of a new format of message.

In one embodiment, the method further comprises: determining that the structured uplink buffer status report includes information relevant to a scheduler at another of the one or more base stations; and forwarding the information relevant to a scheduler at another of the one or more base stations to said another of the one or more base stations. Accordingly, in some implementations, use of X2 signalling may replace increased direct network signalling from a user to each scheduler of interest in a dual signalling scenario.

In one embodiment, the structured uplink buffer status report comprises an independent uplink buffer status report for each scheduler to be used by the user equipment.

In one embodiment, the structured uplink buffer status report includes grouped buffer status information for each scheduler to be used by the user equipment.

In one embodiment, the grouped buffer status information includes an indication of a scheduler to which the information contained therein is of relevance.

In one embodiment, the grouped buffer status information is encoded such that it can only be decoded by a scheduler to which the information is of relevance.

A fifth aspect provides a computer program product operable, when executed on a computer, to perform the method of the fourth aspect.

A sixth aspect provides a base station operable to receive an indication of user equipment uplink buffer status in a wireless communications network in which user equipment is configured to communicate with one or more base stations using dual connectivity techniques, the base station comprising: configuration logic operable to determine a dual connectivity configuration being used by user equipment for uplink transmission; reception logic operable to receive a structured uplink buffer status report from user equipment; and extraction logic operable to extract information from the structured uplink buffer status report relevant to a scheduler at the base station.

In one embodiment, the base station further comprises: determination logic operable to determine that the structured uplink buffer status report includes information relevant to a scheduler at another of the one or more base stations; and forward the information relevant to a scheduler at another of the one or more base stations to the another of the one or more base stations.

In one embodiment, the structured uplink buffer status report comprises an independent uplink buffer status report for each scheduler to be used by the user equipment.

In one embodiment, the structured uplink buffer status report includes grouped buffer status information for each scheduler to be used by the user equipment.

In one embodiment, the grouped buffer status information includes an indication of a scheduler to which the information contained therein is of relevance.

In one embodiment, the grouped buffer status information is encoded such that it can only be decoded by a scheduler to which the information is of relevance.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
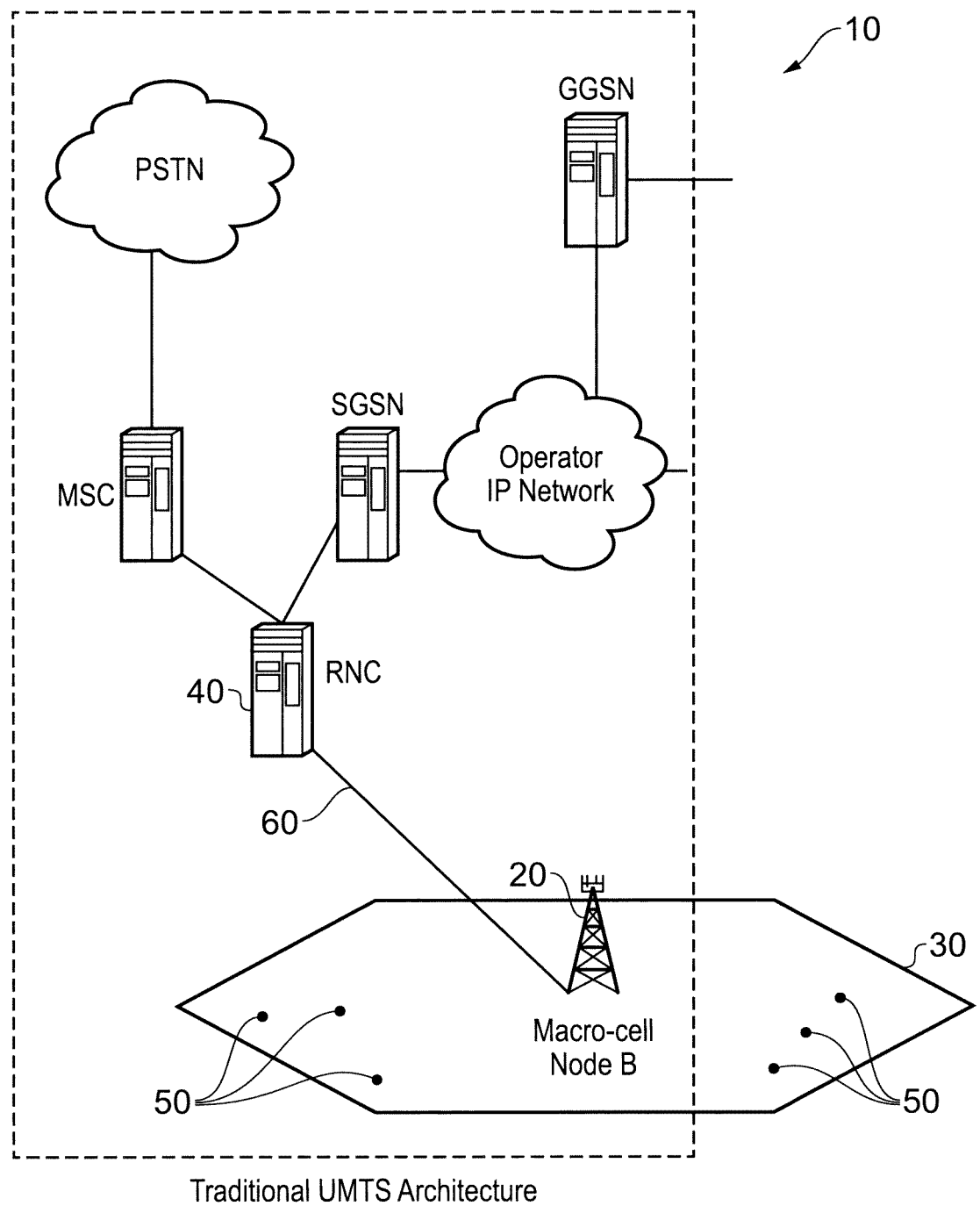
FIG. 1 illustrates the main components of a telecommunications network.

FIG. 1 illustrates schematically the main components of a wireless telecommunications network 10. In the UMTS network architecture illustrated user equipment 50 roam through the wireless telecommunications system. Base stations 20 are provided which support areas of radio coverage 30. A number of such base stations 20 are provided and are distributed geographically in order to provide a wide area of coverage to user equipment 50.

When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small subset of a total number of user equipment and base stations that may be present in a typical communication network. It will also be appreciated that different network architectures may be implemented, including, for example a Long Term Evolution (LTE) network in which the functionality provided by network nodes described above is provided by network nodes which are named differently but have analogous functionality.

In a typical network a centralized scheduler is used to schedule single uplink and downlink traffic flows for each user equipment. As a result, there is no need to distribute any buffer status reports to different schedulers. A typical buffer status report simply indicates the buffer status of established radio bearers. Dual connectivity data flow offloading techniques within a HetNet requires a change to typical operation, since separate schedulers are provided in relation to each cell serving a user and a typical buffer status report includes no information in relation to how to differentiate information in a buffer status report corresponding to traffic offloaded to a small cell scheduler.

Overview

Before discussing the embodiments in any more detail, first an overview will be provided.

Aspects and embodiments described herein provide a method to extract or construct a buffer status report to enable traffic offloading by a scheduler. The method may also be such that a buffer status report provides a scheduler with suitable data flow information directly from user equipment or from another cell.

Offloading uplink traffic in a dual connectivity capable network can be implemented, for example, using one of the following configurations:

In one configuration, user equipment may be operable to transmit all uplink traffic to one cell, for example, the small cell. In a co-channel deployment with dual connectivity, the user equipment may have strong downlink signal from a macro cell, whilst having low path loss in relation to uplink transmissions directed towards the small cell. In such a scenario, all uplink traffic can be transmitted from user equipment to the small cell. As a result, an uplink scheduling grant will originate from the small cell and the small cell requires a buffer status report relating to all the uplink traffic bearers.

In another configuration in a co-channel deployment with dual connectivity, some uplink data flows (radio bearers) can be offloaded to a small cell. According to such a configuration, the small cell is in charge of scheduling the offloaded traffic bearers and therefore the buffer status report relating to the offloaded traffic bearers needs to be known by the small cell.

In another configuration in a co-channel deployment with dual connectivity, uplink data can belong to a radio bearer which is scheduled and received by both macro and small cell, for example, in a network capable to implement multi flow or multi streaming techniques. In such a configuration, the buffer status report of the relevant radio bearer needs to be known by both the macro and small cell.

Aspects and embodiments provide a buffer status reporting mechanism designed to handle all the described configurations whilst maintaining a common buffer status report reporting mechanism.

Figure 2:
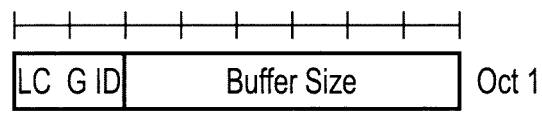
FIG. 2 and FIG. 3 illustrate schematically a known buffer status report format.
Figure 3:
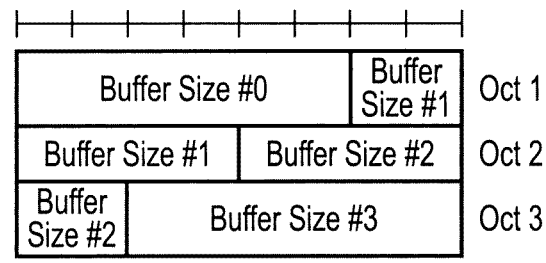

FIG. 2 and FIG. 3 illustrate schematically a known buffer status report format. The current LTE standard defines two buffer status report formats named: short buffer status report (or truncated buffer status report) and long buffer status report. In order to reduce signaling in a network, logical channels are grouped into 4 groups and buffer statuses are transmitted per logical channel group (LCG). According to the short buffer status report format, a buffer status can be signaled for one LCG. According to the long buffer status report format, buffer status is reported for all four LCGs. The report format is shown schematically in FIGS. 2 and 3. The transmission of buffer status report in a Medium Access Control Control Element MAC CE is identified by the associated logical channel ID for a truncated, short or long buffer status report included in a MAC PDU (Protocol Data Unit) sub-header.

Aspects and embodiments described herein follow similar principles, and recognize that it is possible to place information relating to a logical channel such that it is grouped into a number of groups in order to reduce signaling overhead and to report a buffer status per LCG.

In one embodiment, user equipment is operable to format a buffer status report intended for schedulers at the macro and the small cell independently. According to such an embodiment, the resulting transmission considers and creates a different buffer status report MAC control element (buffer status report MAC CE) in relation to each serving scheduler. An indication of the identity of the intended scheduler (cell) is also included in the buffer status report MAC CE as a cell ID index. In an alternative embodiment, an indication of a cell ID is implicitly indicated via the LCID included in the MAC PDU sub-header. Such embodiments require transmission of a buffer status report MAC CE per serving cell.

In a further embodiment, user equipment may be operable to map a buffer status report MAC PDU corresponding to granted uplink resources on a cell by cell basis and the uplink resource(s) used to transmit the buffer status report MAC is used as an implicit indication of which cell the buffer status report is intended for.

In one embodiment, a single buffer status report MAC CE is designed to be used in relation to all serving cells. According to such an embodiment, an indication of serving cell identity is explicitly or implicitly included in a MAC CE. In case of an implicit indication, a buffer status report is formatted according to a cell order. Upon reception of the buffer status report MAC CE, a scheduler is operable to decode the buffer status report field corresponding to the cell it supports. According to some embodiments, the buffer status report MAC CE may be transmitted on any uplink resource granted by any cell. According to such an embodiment, a user equipment specific scrambling code used as user equipment "identification" is known by both macro and small cells participating in a dual connectivity arrangement.

In a further embodiment, user equipment is operable to transmit buffer status report information towards a macro cell. In such an embodiment, LC Groups are configured in such a way to ensure that offloaded radio bearers belong to different LCGs to the bearers served by the macro cell. Upon reception of a buffer status report MAC CE, the macro cell is operable to extract the buffer status report corresponding to offloaded traffic and forward that information to the relevant small cell using the X2 interface. In such an embodiment, the buffer status report experiences backhaul latency. However, if only delay tolerant traffic is offloaded to the small cell, such a backhaul delay on the buffer status report may be tolerated by the small cell scheduler. In such an embodiment, the buffer status report information can be transmitted only on resource granted to a user by the macro cell.

In a further embodiment, the user equipment may be configured to transmit buffer status report information to any cell (using resources granted by any cell). Upon reception of the buffer status report information, the cell extracts the buffer status report information corresponding to the traffic (radio bearers) being served by the cell and remaining buffer status report information is forwarded to the other cell over the X2 interface.

In some embodiments, radio bearers which are served by the macro cell may not be revealed to the other cell, particularly in the case of inter vendor operation, and in such cases, the buffer status report information for each cell can be protected with cell specific coding.

Aspects and embodiments provide a method for providing buffer status reports in a network offering dual connectivity functionality according to which user equipment is served by multiple independent schedulers which may be connected via a non-ideal backhaul link.

Further considerations relate to a method relating to scheduling request triggers and transmission of scheduling requests to corresponding serving schedulers in a dual connectivity deployment scenario.

Existing scheduling request mechanisms typically only work for single or multiple schedulers connected via an ideal backhaul. There is no mechanism which is operable to support multiple schedulers connected via a non-ideal backhaul, which could have up to 60 ms one way latency.

Further aspects and embodiments allow conveyance of scheduling request information intended for different schedulers by means of a single scheduling request message or multiple scheduling requests messages, depending on a scheduling request trigger event, D-SR configuration. A pending scheduling request cancellation may also be configured such that depends on the nature of the transmission.

Scheduling Request Procedure:

Scheduling request (SR) transmission is typically triggered when data arrives at an uplink transmission buffer belonging to a radio bearer on which scheduling request masking is not enabled and there is no uplink grant available for a transmission. Data "arrival" at an uplink transmission buffer is defined either as: arrival of data at an PDCP buffer or at an RLC buffer. In each case a radio bearer is mapped to a logical channel (one to one mapping), therefore data arrival at PDCP and RLC buffer can be considered equivalent with regards to a scheduling request trigger.

For the transmission of a scheduling request, dedicated scheduling request (D-SR) resources are configured by the network on a per user equipment basis. However, if no D-SR are configured, user equipment are allowed to request an uplink grant using RACH. Typically only one D-SR configuration per user equipment is performed.

Dual Connectivity Support

In a network operable to offload uplink traffic according to dual connectivity methods, it will be appreciated that various scenarios are possible. For example:

Scenario 1

Dual connectivity may be implemented such that there is an uplink/downlink split where uplink traffic is served by a small cell whilst downlink traffic is served by a macro cell. Such an implementation can be particularly useful in co-channel deployments.

Scenario 2

Similarly, dual connectivity may be used to offer multi-streaming support, according to which a radio bearer is served by more than one cell in order to achieve transmission diversity and load balancing gain.

Scenario 3

Furthermore, dual connectivity can be used to implement a radio bearer level traffic split according to which some bearers are served by a macro whilst other bearers are offloaded to a small cell.

Scheduling Request Procedure:

Trigger, Transmission and Cancellation of Pending Scheduling Requests

In Scenario 1, the scheduling request is required by the small cell, since the small cell is in charge of the scheduling of uplink traffic. In scenario 2, the scheduling request is required by schedulers located at both the macro and small cell, assuming both schedulers are involved in uplink traffic scheduling. However, at the user equipment typically one scheduling request is triggered due to the uplink data arrival on a corresponding uplink buffer. Scenario 3 requires a scheduling request at the macro and the small cell depending on which radio bearer triggers the scheduling request.

Transmission of a scheduling request intended for different schedulers can be handled by configuring multiple D-SR resources to the user equipment. The user equipment is then required to map the scheduling request trigger to the corresponding D-SR resources. The multiple D-SR is configured independently with varying periodicity to match a required QoS in relation to each of the bearers. Unnecessary allocation of multiple D-SR resource per user equipment is costly to the network, given that dedicated resources are simply to be used for scheduling request transmissions. Therefore allocation of D-SR on a per cell or per scheduler basis should be avoided.

In relation to the dual connectivity deployment scenarios set out above, scenario 1 and 2 require the transmission of single scheduling request by the user equipment. In scenario 3, in a typical deployment, only non-delay critical traffic is offloaded to the small cell, as a result of backhaul latency. Thus the backhaul latency is likely to also be tolerated if a scheduling request is forwarded over a backhaul link. Therefore, a single D-SR configuration can be used even in relation to scenario 3. The scheduling request should indicate an intended scheduler. Thus, according to some embodiments, upon reception of a scheduling request, a receiving base station, for example, a macro base station, is operable to identify that the scheduling request is intended for a different base station, for example, the small cell and forward the corresponding request to the small cell using the X2 interface.

If a macro eNB is unaware that the scheduling request is intended for the small cell, the macro may be operable to allocate radio resources for buffer status report transmission to the macro cell. However, if the macro cell is aware the scheduling request is intended for the small cell, the macro cell does not grant uplink resources for the user equipment in macro cell.

In some embodiments, if a scheduling request transmission is intended for both schedulers at the same time, user equipment may be operable to transmit the scheduling request only to, for example, a macro cell. From a buffer status report transmitted over granted uplink resources in the macro cell, a macro base station may be operable to identify the need to forward the buffer status report to, for example, the small cell.

In some embodiments, an identification of an intended scheduling cell in relation to a transmitted scheduling request can be performed by means of either an implicit or explicit indication. Indication of an intended scheduling cell may be performed by user equipment based on timings or based on decisions made in the frequency domain.

Figure 4:
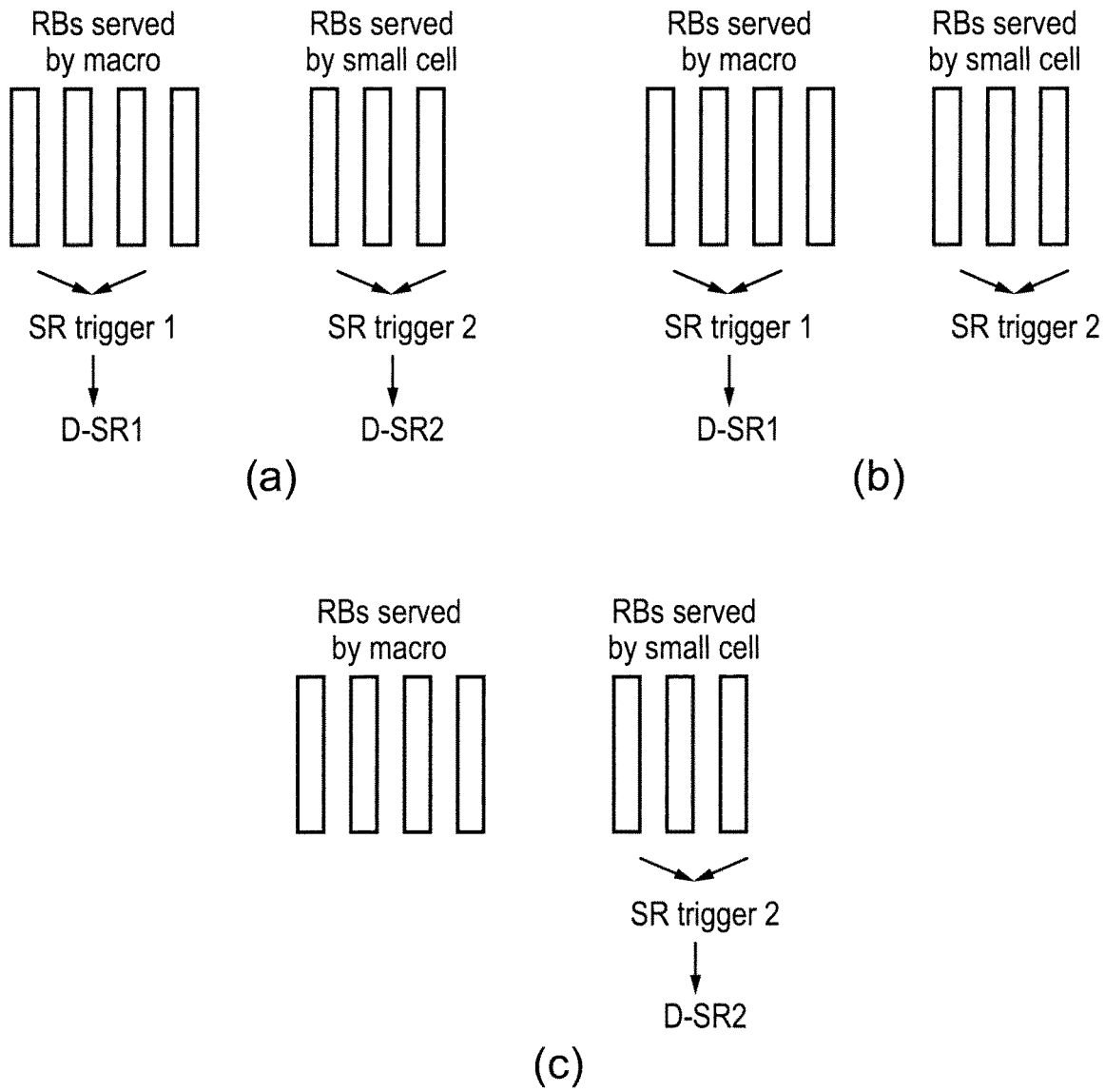
FIGS. 4 and 5 illustrate schematically a scheduling request trigger and transmission according to one embodiment.
Figure 5:
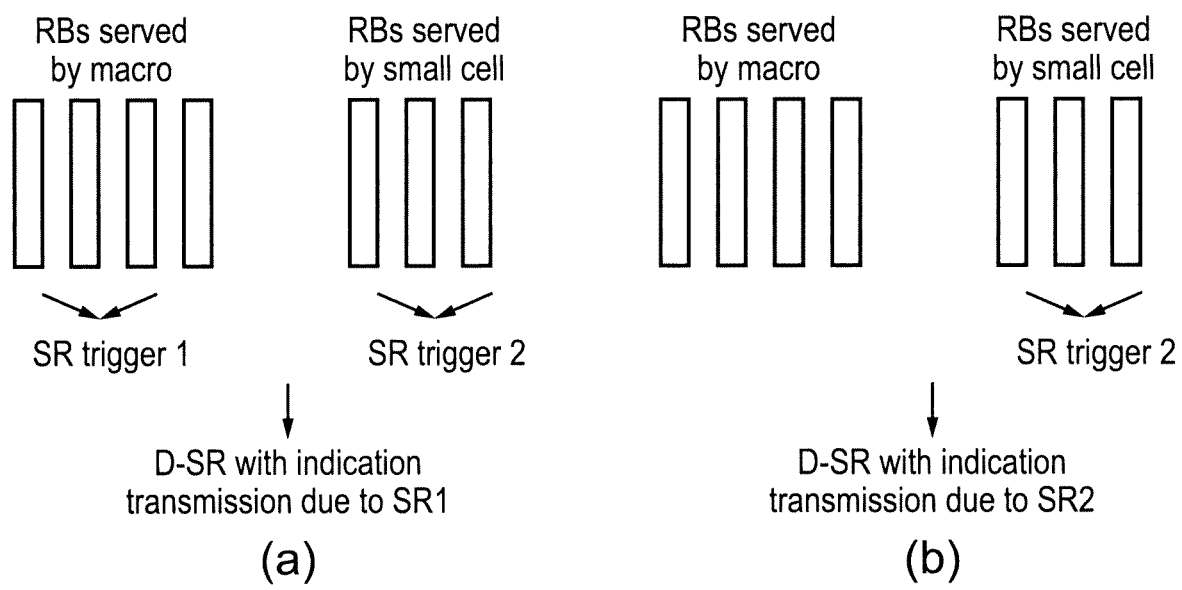

FIGS. 4 and 5 illustrate schematically a scheduling request trigger and transmission according to one embodiment. As shown in FIGS. 4 and 5, if both scheduling request1 and scheduling request2 are triggered, only scheduling request1 is transmitted. The transmission of scheduling request1 "cancels" both pending scheduling request1 and scheduling request2.

FIG. 4 illustrates schematically a scheduling request trigger and transmission according to one embodiment. In the embodiment of FIG. 4, a scheduling request is transmitted on D-SR when multiple D-SR are configured for a given user. According to FIG. 4(*a*) both scheduling request1 and scheduling request2 are triggered at the same time. Scheduling request1 is transmitted on D-SR1 and scheduling request2 is transmitted on D-SR2. According to FIG. 4(*b*) both scheduling request1 and scheduling request2 are triggered, but only scheduling request1 is transmitted on D-SR1. According to FIG. 4(*c*) only scheduling request2 is triggered, and scheduling request2 is transmitted on D-SR2.

FIG. 5 illustrates schematically a scheduling request trigger and transmission according to one embodiment. According to the arrangement of FIG. 5, the scheduling request trigger and transmission is implemented using D-SR in a scenario where a single D-SR is configured for a user. FIG. 5(*a*) shows a case where both scheduling request1 and scheduling request2 are triggered at the same time and scheduling request1 is transmitted on D-SR. FIG. 5(*b*) shows a case where scheduling request2 is triggered, and scheduling request2 is transmitted on D-SR.

In some embodiments, the scheduling request can be performed via RACH access. According to those embodiments, a user may not be configured to have D-SR resource. If no D-SR is configured in relation to a user for either cell participating in dual connectivity methods, user equipment may use RACH access for transmission of a scheduling request.

In one embodiment, if scheduling request1 (for macro) and scheduling request2 (for small cell) are triggered, RACH is performed for scheduling request only on the macro. The network is able to identify scheduling request1 and scheduling request2 from a later buffer status report. The user equipment is operable to cancel both pending scheduling requests on transmission of the request to the macro. If only scheduling request2 (small cell) is triggered, immediate RACH access is not necessary and RACH for scheduling request on small cell can be performed with low urgency.

If D-SR is only configured for one cell, both scheduling request triggers can be communicated to the network over the allocated D-SR. If D-SR with long periodicity is configured for small cell and no D-SR is configured for macro and there is no D-SR opportunity within a configured time window, a scheduling request1 (macro) trigger may initiate a RACH access for scheduling request on the macro.

In some embodiments, a similar scheduling request procedure modification can be implemented if resources become available for a new transmission whilst a scheduling request is triggered. For example, if uplink resources become available on the small cell and scheduling request1 (macro) is triggered, scheduling request1 can be transmitted on configured D-SR on the macro. In such a case, latency over the backhaul link is not tolerable by the scheduling request triggered, due to high priority traffic on macro, for example, measurement reports.

The invention provides a method for providing scheduling request to the network in a scenario that the user equipment is served by multiple independent schedulers which are connected via non-ideal backhaul link.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of transmitting an indication of user equipment uplink buffer status in a wireless communications network in which said user equipment is configured to communicate with more than one base station at a given time using dual connectivity techniques in which a scheduler is provided at each serving base station, said method comprising:
- receiving an indication of a dual connectivity configuration to be used by said user equipment for uplink transmission; and
- structuring an uplink buffer status reporting in which uplink buffer status is grouped for one or more schedulers to be used for said user equipment according to said received indication of a dual connectivity configuration;
- wherein structuring said uplink buffer status reporting comprises constructing an independent uplink buffer status report for each scheduler to be used for said user equipment;
- wherein the method further comprises transmitting said independent uplink buffer status reports to one or more of said base stations using resources granted by said more than one base station; and
- wherein the resource used to transmit each said independent uplink buffer status report implicitly indicates which scheduler each said independent uplink buffer status report is intended for,
- wherein the buffer status reports are formatted according to a cell order,
- wherein the method further comprises mapping a buffer status report MAC PDU corresponding to granted uplink resources on a cell by cell basis and an uplink resource used to transmit the buffer status report MAC PDU is used as an implicit indication of which cell the buffer status report is intended for.

2. The method according to claim 1, wherein transmitting said independent uplink buffer status reports comprises transmitting one of said independent uplink buffer status reports to each scheduler.

3. The method according to claim 1, comprising choosing granted resource for transmission of said independent uplink buffer status reports in dependence upon a scheduler to which the information is of relevance.

4. A computer program product comprising a non-transitory computer usable medium having computer readable program code embodied therein, the computer readable program code configured to be executed to perform the method of claim 1.

5. The method according to claim 1, wherein within said wireless communications network communication between base stations is subject to backhaul latency and an independent scheduler is provided at each of said more than one base stations.

6. User equipment configured to transmit an indication of user equipment uplink buffer status in a wireless communications network in which said user equipment is configured to communicate with more than one base station at a given time using dual connectivity techniques in which a scheduler is provided at each serving base station, said user equipment comprising:
- a receiver configured to receive an indication of a dual connectivity configuration to be used by said user equipment for uplink transmission;
- a processor configured to structure uplink buffer status reporting in which uplink buffer status is grouped for one or more schedulers to be used for said user equipment by constructing an independent uplink buffer status report for each scheduler to be used for said user equipment according to said received indication of a dual connectivity configuration; and
- a transmitter configured to transmit said independent uplink buffer status reports to one or more of said base stations;

wherein:
- the transmitter is further configured to transmit said independent uplink buffer status reports using resources granted by said more than one base station,
- the resource used to transmit each said independent uplink buffer status report implicitly indicates which scheduler each said independent uplink buffer status report is intended for,
- the buffer status reports are formatted according to a cell order, and
- the processor is further configured to map a buffer status report MAC PDU corresponding to granted uplink resources on a cell by cell basis and an uplink resource used to transmit the buffer status report MAC PDU is used as an implicit indication of which cell the buffer status report is intended for.

7. The user equipment according to claim 6, wherein said transmitter is configured to transmit one of said independent uplink buffer status reports to each scheduler.

8. The user equipment according to claim 7, wherein said transmitter is configured to choose granted resource for transmission of said independent uplink buffer status reports in dependence upon a scheduler to which the information is of relevance.

9. The user equipment according to claim 6, wherein said transmitter is configured to choose granted resource for transmission of said independent uplink buffer status reports in dependence upon a scheduler to which the information is of relevance.

10. A method of receiving an indication of user equipment uplink buffer status at a base station in a wireless communications network in which said user equipment is configured to communicate with more than one base station at a given time using dual connectivity techniques in which a scheduler is provided at each serving base station, said method comprising:
- determining a dual connectivity configuration being used by said user equipment for uplink transmission;
- receiving an uplink buffer status report comprising an independent uplink buffer status report for the scheduler from said user equipment, the independent uplink buffer status report having been transmitted using resource granted by the base station, and wherein the resource used to transmit said independent uplink buffer status report implicitly indicates which scheduler the independent uplink buffer status report is intended for; and
- extracting information from said uplink buffer status report relevant to a scheduler at said base station,
- wherein the buffer status reports are formatted according to a cell order,
- wherein a buffer status report MAC PDU corresponding to granted uplink resources is mapped on a cell by cell basis and an uplink resource used to transmit the buffer status report MAC PDU is used as an implicit indication of which cell the buffer status report is intended for.

11. The method according to claim 10, comprising:
- determining that said independent uplink buffer status reports include information relevant to a scheduler at another of said more than one base station; and
- forwarding said information relevant to a scheduler at another of said one or more base stations to said another of said more than one base stations.

12. A computer program product comprising a non-transitory computer usable medium having computer readable program code embodied therein, the computer readable program code configured to be executed to perform the method of claim 10.

13. A base station configured to receive an indication of user equipment uplink buffer status in a wireless communications network in which said user equipment is configured to communicate with more than one base station at a given time using dual connectivity techniques in which a scheduler is provided at each serving base station, said base station comprising:

a processor configured to determine a dual connectivity configuration being used for said user equipment for uplink transmission;

a receiver configured to receive a structured uplink buffer status report comprising an independent uplink buffer status report for the scheduler from said user equipment, the independent uplink buffer status report having been transmitted using resource granted by the base station, and wherein the resource used to transmit said independent uplink buffer status report is used to implicitly indicate which scheduler the independent uplink buffer status report is intended for; and the processor is further configured to extract information from said structured uplink buffer status report relevant to the scheduler at said base station, wherein the buffer status reports are formatted according to a cell order, wherein a buffer status report MAC PDU corresponding to granted uplink resources is mapped on a cell by cell basis and an uplink resource used to transmit the buffer status report MAC PDU is used as an implicit indication of which cell the buffer status report is intended for.

\* \* \* \* \*